United States Patent [19]

Guichard

[11] Patent Number: 4,615,230
[45] Date of Patent: Oct. 7, 1986

[54] GEAR TRANSMISSION COMPRISING TWO WORMS

[76] Inventor: Roland Guichard, 10210 Chaource, France

[21] Appl. No.: 700,700
[22] PCT Filed: May 15, 1984
[86] PCT No.: PCT/FR84/00131
§ 371 Date: Jan. 15, 1985
§ 102(e) Date: Jan. 15, 1985
[87] PCT Pub. No.: WO84/04570
PCT Pub. Date: Nov. 22, 1984

[30] Foreign Application Priority Data

May 16, 1983 [FR] France .................. 83 08056

[51] Int. Cl.⁴ .................. F16H 1/16; F16H 1/20; F16H 37/06; F16H 57/00
[52] U.S. Cl. .................. 74/427; 74/425; 74/410; 74/421 A; 74/665 A; 74/665 F; 74/424.5; 310/83
[58] Field of Search .................. 74/427, 410, 425, 458, 74/457, 424.5, 421 A, 664, 665 A, 665 F; 310/83

[56] References Cited

U.S. PATENT DOCUMENTS

| | | | |
|---|---|---|---|
| 1,551,474 | 8/1925 | Fasset | 74/427 |
| 4,287,767 | 8/1981 | Guichard | 74/410 |
| 4,369,387 | 1/1983 | Haar et al. | 310/83 |
| 4,444,071 | 4/1984 | Guichard | 74/427 |

FOREIGN PATENT DOCUMENTS

| | | |
|---|---|---|
| 18932 | 7/1882 | Fed. Rep. of Germany . |
| 275399 | 6/1914 | Fed. Rep. of Germany . |
| 2372998 | 6/1978 | France . |
| 2521671 | 8/1983 | France . |
| 2067 | of 1913 | United Kingdom . |
| 140223 | 3/1920 | United Kingdom . |

*Primary Examiner*—Lawrence J. Staab
*Assistant Examiner*—Michael D. Bednarek
*Attorney, Agent, or Firm*—Cushman, Darby & Cushman

[57] ABSTRACT

The driving shaft (11) is equipped with two oppositely threaded worms (13a, 13b) with which respectively mesh on opposite sides two worm-wheels (14a, 14b) of a first kinematic channel and two worm-wheels (16a, 16b) of a second kinematic channel, and the worm-wheels of the two channels situated on the same side of the shaft (1) mesh together, the worm-wheels (14a, 14b) of one channel being constrained to rotate with intermediate gear-wheels (15a, 15b) which mesh with a gear-wheel (17) mounted on the driven output shaft, the shafts which carry the worm-wheels of the two kinematic channels being mounted to float in the axial direction.

12 Claims, 10 Drawing Figures

GEAR TRANSMISSION COMPRISING TWO WORMS

The present invention concerns a gear transmission having a particularly high efficiency, said transmission being suitable, inter alia, for constituting a speed reducer suitable for driving automobile vehicle accessories, for example.

There has already been proposed, in French Pat. No. 2 372 998, a gear transmission comprising a driving shaft and a driven shaft, with different angular speeds, the two shafts having axes fixed relative to one another, one of the shafts carrying two worms having algebraically different pitches and being connected to the other shaft by two different gear kinematic channels each comprising one of the aforementioned two worms; at least one of the two kinematic channels comprises at least one intermediate worm-wheel having an axis which is fixed, neglecting tolerances, relative to the axes of the two shafts of the transmission. In a preferred embodiment of this gear transmission, it is proposed that the driving shaft of the transmission carry two worms with opposite directions, each of the two kinematic channels comprising a helical tooth intermediate worm-wheel meshing with one of the two worms, the two intermediate worm-wheels having their axes on opposite sides of the shaft carrying the two worms and each being fast with a coaxial intermediate gear-wheel, these two intermediate gear-wheels meshing with a common output gear-wheel fast with the driven shaft; the axes of the driving and driven shafts are perpendicular and axes of the intermediate worm-wheels are parallel to the axis of the driven shaft.

A device of this kind gives total satisfaction, in particular when it is used as a speed reducer for driving windshield wipers of an automobile vehicle by means of an electric motor. The two kinematic channels of a transmission in accordance with the hereinabove defined embodiment transmit in equal proportions the power fed into the driven shaft; each worm on the driven shaft is subjected to reaction forces and, if the pitches of the worms are equal and opposite, these reactions are symmetrical relative to the central point of the double worm: in a plane passing through the axis of the double worm and perpendicular to the axes of the two intermediate worm-wheels, the reaction components are equal, opposite and colinear and consequently cancel one another out; on the other hand, in a plane perpendicular to the preceding plane of projection and passing through the axis of the double worm, or perpendicular to this axis, the components of the reactions on the two worms do not cancel out and there results a bending moment in the worm and thus reaction forces in the bearings supporting the shaft carrying the double worm. The existence of this reaction force of the shaft on the bearings which carry it explains why the efficiency of a transmission of this kind is approximately 70%, which could be regarded as highly satisfactory as compared with prior art transmissions. Moreover, the magnitude of the reactions on the driving shaft bearings is directly proportional to the inclination of the helical threads of the double worm; thus in practice it has been necessary to limit the inclination of the threads of the double worm to a value in the vicinity of 15°; it is known, however, that the efficiency of transmission between a worm and a tangential gear-wheel is optimum for values of the thread inclination two to three times higher. This practical limitation on the inclination of the worm threads thus also constitutes a limitation on the efficiency of a transmission of this kind.

The objective of the present invention is to define a gear transmission of the type mentioned hereinabove, said transmission having significantly improved efficiency. This improvement in efficiency is achieved by reducing or completely eliminating the torque produced by the reaction forces exerted on the two worms of the transmission, whence there results a considerable reduction or even elimination of the reaction forces exerted by the shaft carrying the worms on its bearings. For the same power transmission capability, it is thus possible to reduce the dimensions of the double worm and to employ smaller bearings to support the shaft carrying the double worm. It is thus seen that, for the same transmitted power, the weight and cost of the transmission may be reduced as compared with a transmission of the type described in French Pat. No. 2 372 998. Moreover, the elimination of reaction forces on the bearings makes it feasible to consider increasing the inclination of the worm threads, resulting in an increase in the overall efficiency of the transmission.

In accordance with the invention, each of the two kinematic channels of the preferred prior art embodiment of transmission as described in outline hereinabove is duplicated; thus each kinematic channel comprises an intermediate worm-wheel linked to an intermediate gear-wheel, which meshes with the output gear-wheel, and an auxiliary worm-wheel, which meshes with the aforementioned intermediate worm-wheel and with that of the two worms which does not cooperate with said intermediate worm-wheel. Thus there is proposed a transmission which comprises two worms, of opposite direction, and four worm-wheels. In each kinematic channel, the intermediate worm-wheel cooperates with one of the worms and the auxiliary worm-wheel with the other, the intermediate and auxiliary worm-wheels meshing with one another. In accordance with the invention, it is further provided that the two intermediate worm-wheels of the two kinematic channels are able to move parallel to their axes by substantially equal amounts in the same direction; the two intermediate worm-wheels are thus motionally linked and their median plane perpendicular to their axes may be moved away from the axis of the double worm to a greater or lesser extent whilst remaining parallel thereto; transverse displacement of the intermediate worm-wheels is unrestricted during operation of the transmission.

Adoption of the two characteristics of the invention as defined hereinabove makes it possible to achieve particularly beneficial results. First of all, it is found that there is a self-balancing of forces between the two transmission kinematic channels. If one of the kinematic channels tends to transmit a higher force than the other, there results an increase in the reaction forces on the intermediate and auxiliary worm-wheels of the more heavily loaded kinematic channel and the component of the reaction exerted on the intermediate worm-wheel parallel to its axis increases whereas the like component corresponding to the other intermediate worm-wheel decreases in a correlative manner. There results a displacement of the set of two intermediate worm-wheels parallel to their axes, in a direction which tends to modify the aforementioned components until their values are equal and opposite. The unrestricted displacement of the two intermediate worm-wheels therefore provides for continuous self-balancing of forces between the two kinematic channels.

Also, knowing that the two kinematic channels are equally loaded in operation, it is possible to examine the operation of one only of the two kinematic channels, the position of the intermediate worm-wheels relative to the axis of the shaft carrying the worms being assumed fixed. The worm carrier shaft is mounted without longitudinal thrust bearings: if the power transmitted by the auxiliary worm-wheel is not strictly equal to the power transmitted by the intermediate worm-wheel of the same kinematic channel, it is clear that the longitudinal components of the reaction forces exerted on the two worms will no longer be equal and that the worm carrier shaft will be displaced longitudinally to secure equal values of the opposed longitudinal components of the two reaction forces. Thus it is seen that there is an automatic balancing of the power transmitted by the auxiliary worm-wheel and the intermediate worm-wheel of the same kinematic channel. Given that the two kinematic channels are equally loaded by virtue of the self-balancing effect of the unrestricted displacement of the intermediate worm-wheels, it is seen that the two kinematic channels ensure that the worm carrier shaft is always in the same longitudinal position under equilibrium conditions.

In other words, it is seen that by virtue of the unrestricted longitudinal positioning of the worm carrier shaft and the unrestricted transverse positioning of the two intermediate worm-wheels relative to the double worm, there is obtained a self-balancing effect whereby one quarter of the power is transmitted by each of the four worm-wheels associated with the double worm. As a result of this, the four reaction forces exerted on the double worm have equal values. If the arrangement is such that the plane of the axes of an intermediate worm-wheel and the auxiliary worm-wheel which does not mesh with it are perpendicular to the axis of the double worm, the four reaction forces exerted on the double worm are distributed in such a way that their components in the planes passing through the axis of the double worm and parallel or perpendicular to the axes of the worm-wheels are equal and opposite in pairs; the result of this is that there is no longer any bending moment within the double worm and that there is no longer any reaction force on the worm carrier shaft bearings. A transmission mechanism of this kind has the same efficiency irrespective of the rotation direction of the double worm.

On the other hand, if the plane of the axes of an intermediate worm-wheel and the auxiliary worm-wheel which does not mesh with it is slightly oblique relative to the axis of the double worm, there will not be achieved exact compensation of the components of the four reaction forces and there will thereafter remain a very small bending moment in the shaft and a small reaction force on the worm carrier shaft bearings.

It should be noted that the floating disposition of the two intermediate worm-wheels linked motionally provides a number of secondary advantages.

Firstly, if it is assumed that the output gear-wheel is disengaged from the two intermediate gear-wheels which drive it and if the worm carrier shaft is assumed fixed, the mounting of the output gear-wheel on the intermediate gear-wheels is considerably facilitated by the possibility of moving said intermediate worm-wheels transversely. Such transverse displacement causes rotation in opposite directions of the two intermediate worm-wheels and the intermediate gear-wheels which are associated with them and, for a particular value of this displacement, it becomes possible to mesh the output gear-wheel with the two intermediate gear-wheels. Note that the transverse position of the auxiliary worm-wheels has no effect with regard to the assembly or operation of the transmission. If the two intermediate worm-wheels are moved transversely while the auxiliary worm-wheels are fixed, there occurs helical displacement of the intermediate worm-wheel relative to the auxiliary worm-wheel, without any other modification to the system. The position of the auxiliary worm-wheels may therefore be fixed relative to the axis of the double worm; however, there is no reason why the auxiliary worm-wheels should not move transversely relative to the axis of the double worm at the same time as the intermediate worm-wheels, which leads to the idea of mounting the two intermediate worm-wheels and the two auxiliary worm-wheels on common transverse displacement means.

Secondly, transverse displacement of the intermediate worm-wheels relative to the axis of the double worm may be exploited to render the transmission irreversible when the latter is not functioning. If the transmission is assumed to be halted and if it is assumed that the two intermediate worm-wheels are in their equilibrium position, it is clear that the transmission in accordance with the invention, given its high efficiency, is necessarily reversible. It is often useful to procure irreversibility when stopped, however. The presence of transverse displacement means for the intermediate worm-wheels in the device in accordance with the invention provides for rendering the transmission irreversible. If the transverse displacement means for the two intermediate worm-wheels is moved, all the conditions for correct operation of the transmission are eliminated and conditions are created leading to very poor efficiency, whence there results in practice irreversibility of the transmission with regard to any input from the output gear-wheel. This transverse displacement of the intermediate worm-wheels may be achieved manually or by any appropriate mechanical, pneumatic, hydraulic or electromagnetic means. If the force applied to the transverse displacement means for the intermediate worm-wheels is removed and if the double worm is again driven in rotation, the transverse displacement means automatically return to the position in which the reaction forces on the double worm balance out and the transmission efficiency is optimized.

It is clear that the worms on the worm carrier shaft may be worms with one or more threads. The worm-wheels which mesh with these worms are cylindrical worm-wheels with helical teeth compatible with the two worms. One of the auxiliary worm-wheels has a righthand helical thread whereas the other has a lefthand helical thread; likewise, one of the intermediate worm-wheels has a righthand helical thread whereas the other has a lefthand helical thread. The intermediate gear-wheels and the output gear-wheel preferably have straight teeth, but these teeth may nevertheless be very slightly helical, the helix angle then being very different from the angles adopted for the worms and the worm-wheels of the transmission.

The object of the present invention is therefore the new industrial product which constitutes a gear transmission comprising a driving shaft and a driven shaft, with different angular speeds and substantially perpendicular axes, the two shafts having axes fixed relative to one another, one of the shafts carrying two worms of opposite direction, being linked to the other shaft by two different gear kinematic channels and being unrestricted in terms of its longitudinal position, each of the two kinematic channels comprising a helical tooth intermediate worm-wheel meshing with one of the two worms, the two intermediate worm-wheels having their axes on opposite sides of the shaft carrying the two worms and each being fast with a coaxial intermediate gear-wheel, the two intermediate gear-wheels meshing with a common gear-wheel driving the transmission shaft, which does not carry the worms, the axes of the intermediate worm-wheels being substantially parallel to the axis of the shaft which does not carry the worms, characterized in that each kinematic channel is duplicated and comprises, in addition to the aforementioned intermediate worm-wheel, a helical tooth auxiliary worm-wheel meshing with that of the two worms which does not cooperate with said intermediate worm-wheel, said auxiliary worm-wheel meshing with the intermediate worm-wheel of the same kinematic channel, the two intermediate worm-wheels of the two kinematic channels being subject, in operation, to unrestricted displacement parallel to their axes of substantially the same magnitude and in the same direction.

In a preferred embodiment, the two intermediate gear-wheels and the gear-wheel with which they both mesh have straight teeth; the pitches of the two worms are equal and opposite, the radii of the pitch cylinders of the two intermediate worm-wheels are equal to one another, as are those of the two intermediate gear-wheels; the two intermediate worm-wheels are linked together by means able to move in translation parallel to the axes of the two intermediate worm-wheels. In a first variant, the means linking the two intermediate worm-wheels is a plate relative to which the two intermediate worm-wheels may rotate freely; in a second variant, the means linking the two intermediate worm-wheels is an idler roller which cooperates with a corresponding rolling track formed on each of the two intermediate worm-wheels. Provision may advantageously be made for the means linking the two intermediate worm-wheels also to link the two auxiliary worm-wheels, which can then rotate freely relative to this linking means.

In a first embodiment, the gear-wheel which meshes with the two intermediate gear-wheels has its pitch cylinder externally tangential to the pitch cylinders of the two intermediate gear-wheels. In another embodiment, the gear-wheel which meshes with the two intermediate gear-wheels has its pitch cylinder internally tangential to the pitch cylinders of the two intermediate gear-wheels.

Provision may also be made for the radii of the pitch cylinders of the auxiliary worm-wheels to be equal to the radii of the pitch cylinders of the intermediate worm-wheels; it is also possible for these radii to be different, however.

Provision may advantageously be made for the axis of the intermediate worm-wheel of one kinematic channel and the axis of the auxiliary worm-wheel of the other kinematic channel to define a plane perpendicular to the axis of the shaft carrying the two worms; however, it is also possible to provide for the plane defined by these two worm-wheel axes to be oblique relative to the axis of the shaft carrying the two worms.

In a preferred application of the transmission in accordance with the invention, the driving shaft is that which carries the two worms, the transmission being a speed reducer; the two worms on the driving shaft are disposed adjacently on said shaft, the driving shaft being supported by two bearings disposed on the same side of the assembly formed by the two adjacent worms; the driving shaft is driven by an electric motor and the driven shaft actuates an automobile vehicle windshield wiper linkage.

To better explain the object of the invention, there will now be described by way of purely illustrative and non-limiting examples a number of embodiments shown in the accompanying drawing.

In this drawing:

FIGS. 1a and 1b schematically represent the distribution of reaction forces for a transmission in accordance with the invention comprising a ring output gear-wheel, FIG. 1a showing the projection of the reaction forces on the plane passing through the axis of the double worm and perpendicular to the axes of the worm-wheels, whereas FIG. 1b shows the projection of the reaction forces onto the plane passing through the axis of the double worm and perpendicular to the preceding projection plane;

Figure 7:
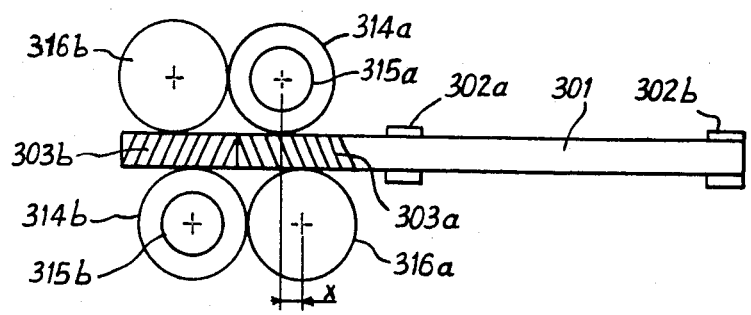
FIG. 7 represents a schematic of an alternative embodiment of the transmission in accordance with the invention in which the plane of the axes of one auxiliary worm-wheel and of the intermediate worm-wheel of the other kinematic channel is not perpendicular to the axis of the double worm.
Figure 8:
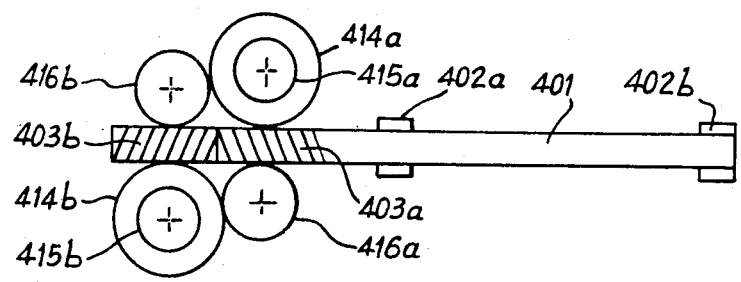
Figure 9:
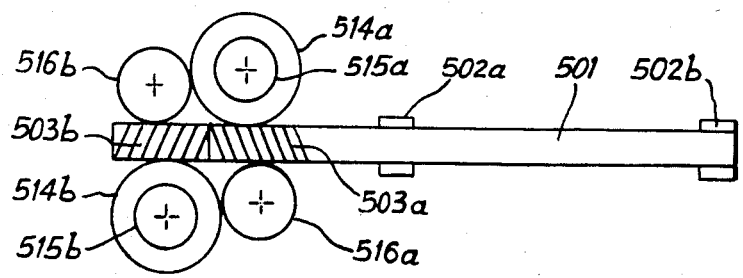

FIG. 8 schematically represents another alternative embodiment of the transmission in accordance with the invention in which the diameters of the auxiliary worm-wheels are different from the diameters of the intermediate worm-wheels;

FIG. 9 schematically represents another variant of the transmission in accordance with the invention in which the two characteristics of the variants represented in FIGS. 7 and 8 are used in combination.

Figure 1A:
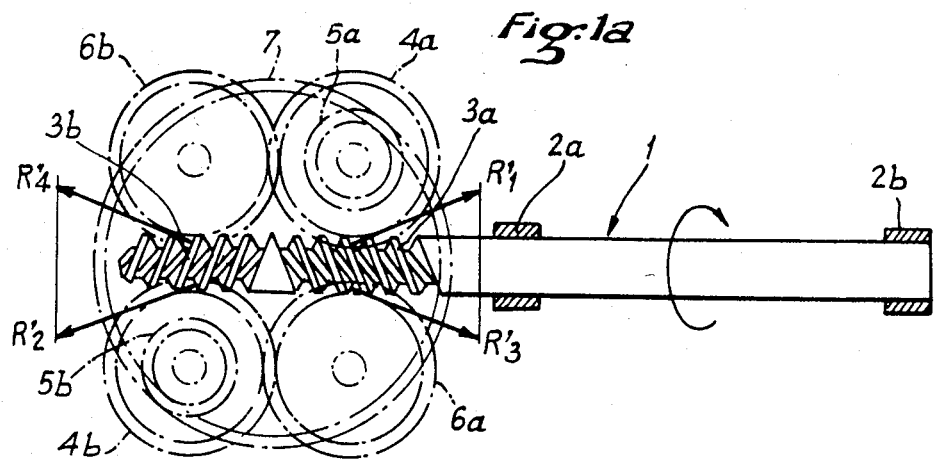
Figure 1B:
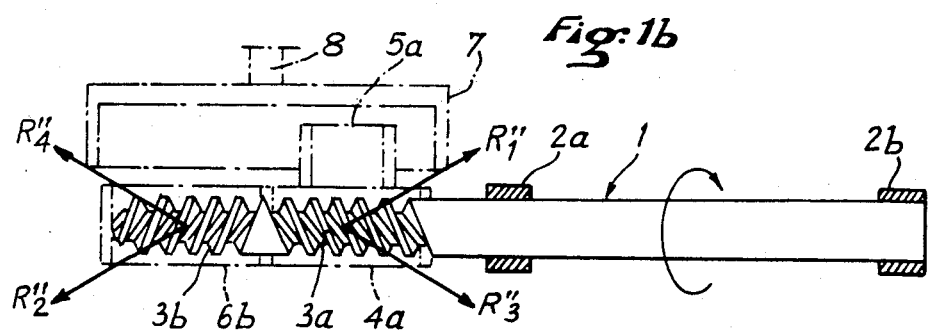

Referring to FIGS. 1a and 1b, the reference numeral 1 designates the driving worm carrier shaft of a transmission in accordance with the invention. The shaft 1 is supported by two bearings 2a, 2b in which it is free to slide. The shaft 1 carries two double-thread helical worms 3a, 3b of equal and opposite pitch. The two worms 3a, 3b are disposed in the area of the shaft 1 which is outside the area between the bearings 2a and 2b. The gears of the transmission are represented in chain-dotted line. The transmission comprises two intermediate worm-wheels 4a, 4b featuring helical teeth compatible with the worms 3a, 3b; the two intermediate worm-wheels 4a, 4b have the same pitch cylinder; their axes are parallel to one another and perpendicular to the axis of the shaft 1; they mesh with the worms 3a, 3b, respectively. The intermediate worm-wheels 4a, 4b are each fast with a straight tooth intermediate gear-wheel, respectively designated 5a, 5b, the gear-wheels 5a, 5b having the same axes as the intermediate worm-wheels 4a, 4b, respectively. The transmission further comprises two auxiliary worm-wheels 6a, 6b; the worm-wheels 6a, 6b have helical teeth and the same pitch cylinders as the intermediate worm-wheels 4a, 4b; the worm-wheel 6a meshes with the worm 3a and with the intermediate worm-wheel 4b; the worm-wheel 6b meshes with the worm 3b and with the intermediate worm-wheel 4a; the axes of the auxiliary worm-wheels 6a and 6b are parallel to the axes of the intermediate worm-wheels 4a and 4b; the planes of the axes of the worm-wheels 4a and 6a, on the one hand, and 4b and 6b, on the other hand, are perpendicular to the axis of the shaft 1. The intermediate gear-wheels 5a and 5b mesh with an output gear-wheel 7 consisting of an internally toothed ring, the intermediate gear-wheels 5a, 5b being internally tangential to the output gear-wheel 7. In FIG. 1a $R'_1$, $R'_2$, $R'_3$ and $R'_4$ designate the projections onto the plane passing through the axis of the shaft 1 and perpendicular to the axes of the worm-wheels 4a, 4b, 6a, 6b of the reaction forces exerted on the shaft 1 by the intermediate worm-wheels 4a, 4b and the auxiliary worm-wheels, 6a, 6b, respectively. In FIG. 1b, $R''_1$, $R''_2$, $R''_3$, $R''_4$ designate the projections of the same reaction forces on the plane passing through the axis of the shaft 1 and parallel to the axes of the worm-wheels 4a, 4b, 6a, 6b. Although this is not shown in the drawing, the intermediate worm-wheels 4a, 4b are carried by common transverse displacement means which enable them to move freely parallel to their axes, these displacements being of the same magnitude and in the same direction. The output gear-wheel 7 is fast with the output shaft 8 of the transmission which is disposed coaxially with the output gear-wheel 7.

The transmission which has just been described features two duplicated kinematic channels: the first kinematic channel comprises the worm-wheels 4a and 6b; the second kinematic channel comprises the worm-wheels 4b and 6a. If the power transmitted by one of the two kinematic channels tends to exceed the power transmitted by the other, the components parallel to the axis of the worm-wheels of the forces $R''_1$ and $R''_4$, on the one hand, and $R''_2$ and $R''_3$, on the other hand, become unequal and the resultant of these components is not zero; a resultant reaction force is thus exerted on the combination formed by the two intermediate worm-wheels 4a, 4b parallel to the axes of these worm-wheels, which produces a transverse displacement of the combination of the two worm-wheels in the direction which tends to cancel out said resultant. It is thus seen that by virtue of the floating position of the worm-wheels 4a and 4b there is a self-balancing of the powers transmitted by the two kinematic channels.

Moreover, in the same kinematic channel, the power transmitted from the shaft 1 to the shaft 8 is equally divided between the paths which pass through the intermediate worm-wheel 4a and 4b and the auxiliary worm-wheel 6b or 6a; if an imbalance tends to occur, the forces $R'_1$ and $R'_4$ or $R'_2$ and $R'_3$ become unequal and the resultant of these forces on the axis of the shaft 1 becomes non-zero, which produces a longitudinal displacement of the shaft 1 in the direction which tends to cancel out this resultant. It is thus seen that the unrestricted longitudinal positioning of the shaft 1 provides for the self-balancing of the powers transmitted by the two paths of the same kinematic channel.

In other words, the device which has just been described automatically ensures equal distribution of the power transmitted from the double worm 3a, 3b by the four worm-wheels 4a, 4b, 6a, 6b. As a result of this, the components $R'_1$, $R'_2$, $R'_3$, $R'_4$, on the one hand, and $R''_1$, $R''_2$, $R''_3$, $R''_4$, on the other hand, are equal and symmetrical relative to the axis of the shaft 1. As a result, these components cancel out in pairs and the shaft 1 is not subject to any bending moment, so that there is no reaction on the bearings 2a and 2b of the shaft 1. Given these conditions, it is found that the efficiency of a transmission of this kind is exceptionally high and may be as much as 80%. This transmission thus constitutes a significant technical improvement relative to the disclosure of French Pat. No. 2 372 998. The absence of reaction forces on the bearings 2a and 2b enables their dimensions to be reduced; the absence of any bending moment in the shaft 1 enables the dimensions of the double worm to be reduced for a given transmitted power.

Figure 2:
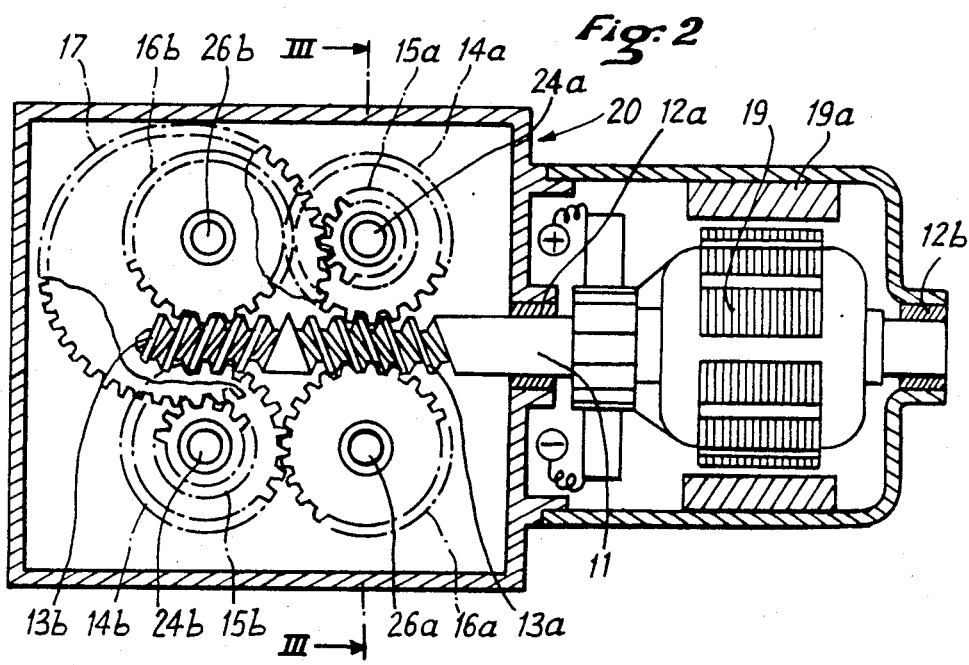
FIG. 2 shows in plan view a motor-gearbox in which the gearbox part consists of a transmission in accordance with the invention, the output gear-wheel being externally tangential to the intermediate gear-wheels, the auxiliary and intermediate worm-wheels having the same pitch cylinder.

In FIG. 2 there is represented another embodiment of the transmission of FIGS. 1a and 1b, said transmission being this time disposed in a casing and connected to an electric motor to constitute a motor-gearbox usable, for example, to drive the windshield wipers of an automobile vehicle. The components which have been described with reference to FIGS. 1a and 1b and which bear reference numbers between 1 and 6 inclusive are repeated identically in the embodiment of FIG. 2, where they are designated by reference numerals increased by 10 relative to those of the corresponding components in FIGS. 1a and 1b. The shaft 11 is fast with the rotor 19 of an electric motor. The combination comprising the electric motor and the transmission is disposed in a casing generally designatd 20, said casing carrying internally the field windings 19a of the electric motor. The worms 13a, 13b each cooperate with an intermediate worm-wheel 14a, 14b and an auxiliary worm-wheel 16a, 16b. The two intermediate worm-wheels 14a, 14b are fast with two intermediate gear-wheels 15a, 15b with straight teeth which mesh with a straight toothed output gear-wheel 17; the output gear-wheel 17 is externally tangential to the intermediate gear-wheels 15a and 15b and is fast with the driven shaft of the transmission (not shown in the drawing).

In this embodiment, the four worm-wheels 14a, 14b, 16a, 16b are mounted between two plates 21 and 22; the worm-wheel 16b is carried by the plate 21 in line with a notch in the plate 22. The plates 21 and 22 are parallel to one another and perpendicular to the axes of the worm-wheels 14a, 14b, 16a, 16b whose shafts, respectively designated 24a, 24b, 26a, 26b, are carried by the casing 20, as is clearly visible in FIG. 3. The plates 21 and 22 slide freely on these shafts. The auxiliary worm-wheel 16a is extended by a spacer sleeve 25, so as to have the same overall height as the combination formed by an intermediate worm-wheel and the intermediate gear-wheel associated with it. The two plates 21 and 22 bear on opposite sides of the set of worm-wheels and are linked together by fastening means not shown in the drawing. The combination of the two plates 21 and 22 and the worm-wheels which they enclose thus constitutes a cage which is freely movable along transverse sliding shafts constituted by the four shafts 24a, 24b, 26a, 26b of the four worm-wheels of the transmission.

The self-balancing of the transmission of power through the four worm-wheels is thus effected, in this variant, by virtue of the floating mounting of the cage 21, 22 and the unrestricted axial positioning of the shaft 11. The advantages obtained with this embodiment are the same as those indicated for the embodiment of FIGS. 1a and 1b.

Figure 4:
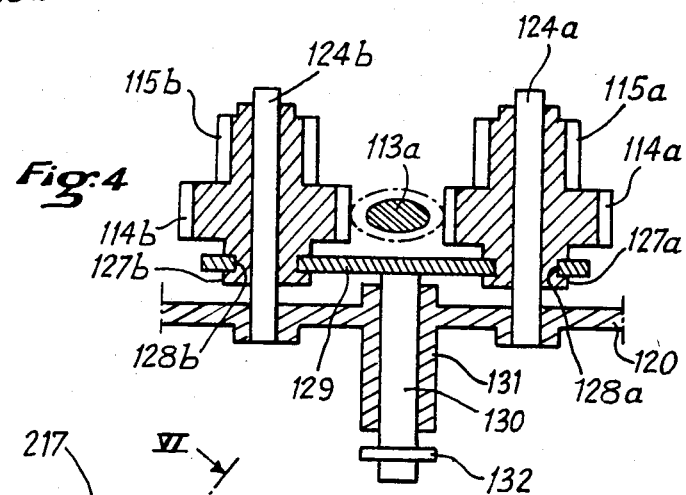
FIG. 4 represents another embodiment of the intermediate worm-wheel transverse displacement means for a transmission of the type shown in FIG. 2.

Referring to FIG. 4, there is represented another embodiment of the transverse displacement means for the intermediate worm-wheels of the transmission of FIG. 2. To avoid all possibility of confusion, the components in FIG. 2 which are also shown in FIG. 4 have been designated by reference numbers increased by 100 relative to those which desginate the corresponding components in FIG. 2. FIG. 4 is a cross-section through the axes of the intermediate worm-wheels of the transmission of FIG. 2. In this variant embodiment, the auxiliary worm-wheels of the transmission are not able to move transversely. The intermediate worm-wheels 114a, 114b are mounted on respective shafts 124a, 124b, said shafts being held at the bottom of the casing 120 of the transmission. Below each intermediate worm-wheel 114a, 114b there is disposed an extender sleeve 127a, 127b in which is formed a respective groove 128a, 128b. A plate 129 links the two intermediate worm-wheels 114a, 114b and encloses each worm-wheel at the level of the groove 128a, 128b, the worm-wheels being able to turn freely relative to the plate 129 but being fast with this plate by virtue of the cooperation of the plate with the grooves 128a, 128b. The plate 129 is fast with a sliding shaft 130 able to move within a sleeve 131 fast with the casing 120, the axis of said sleeve being perpendicular to the axis of the double worm of the transmission. Transverse displacement of the plate 129 is limited, on the one hand, by its bearing on one end of the sleeve 131 and, on the other hand, by means of a washer 132 disposed at the bottom of the sliding shaft 130, externally of the sleeve 131.

Figure 3:
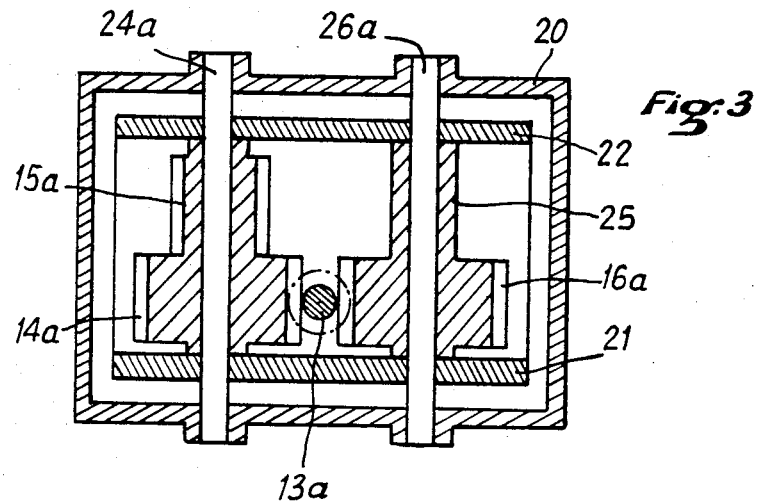
FIG. 3 represents a cross-section on the line III—III in FIG. 2.

In this variant of the embodiment of FIG. 2, only the intermediate worm-wheels are able to move transversely, but nevertheless all the advantages of the embodiment respresented in FIGS. 2 and 3 are retained.

Figure 5:
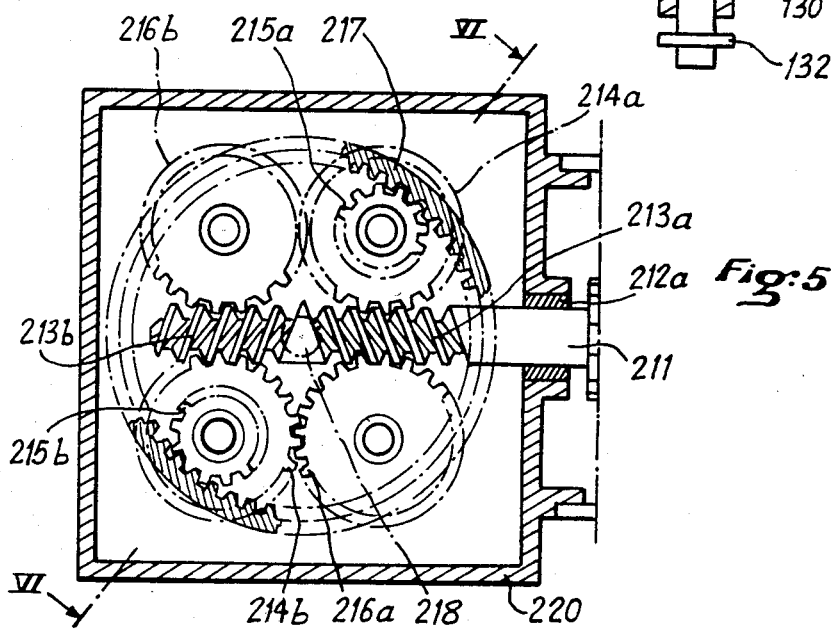
FIG. 5 represents a variant of the speed reducer of FIG. 2, in which variant the output gear-wheel is a ring gear-wheel internally tangential to the intermediate gear-wheels.
Figure 6:
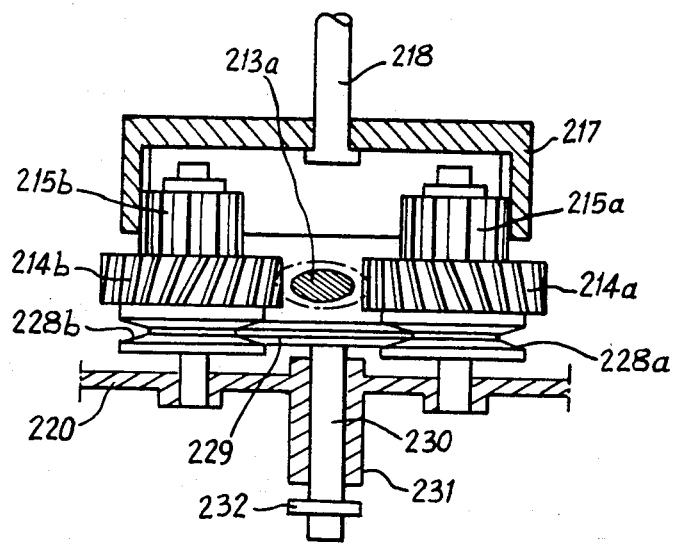
FIG. 6 is a partial cross-section on the line VI—VI in FIG. 5.

There is shown in FIGS. 5 and 6 another embodiment of the transmission in accordance with the invention. In this embodiment, there are again and identically the double worm, the intermediate and auxiliary worm-wheels and the intermediate gear-wheels as represented in FIG. 2. These common parts have been designated by reference numbers which are equal to those of the corresponding parts of the embodiment of FIG. 2 increased by 200. Thus there is, within a casing 220, a shaft 211 which carries two opposite pitch helical worms 213a, 213b; these two worms cooperate with, on the one hand, two intermediate worm-wheels 214a, 214b and, on the other hand, two auxiliary worm-wheels 216a, 216b, the relative positions of these worm-wheels being identical to those of the FIG. 2 embodiment. The intermediate worm-wheels 214a, 214b respectively carry straight toothed intermediate gear-wheels 215a, 215b which mesh with an output gear-wheel 217; however, in this embodiment the output gear-wheel 217 is in the form of a ring which meshes internally with the two intermediate gear-wheels 215a, 215b, as already described in relation to the embodiment of FIGS. 1a and 1b. The output shaft with the gear-wheel 217 is designated 218 and is disposed coaxially with the straight-toothed gear-wheel 217. In this embodiment, the two auxiliary worm-wheels 216a, 216b are not able to move transversely; only the intermediate worm-wheels 214a, 214b can move in translation parallel to their axis by means of an arrangement which is represented in FIG. 6.

Each intermediate worm-wheel 214a, 214b comprises at its base a respective pulley-wheel 228a, 228b, the two pulley-wheels cooperating with a common roller 229 which enters the grooves in the two pulley-wheels 228a, 228b. The roller 229 comprises a shaft 230 which can turn freely in a sleeve 213 of the casing 220. The shaft 230 is able to slide freely within the sleeve 231 between, on the one hand, the position in which the roller 229 bears against one end of the sleeve 231 and, on the other hand, the position in which a washer 232 fast with the shaft 230 bears against the other end of the sleeve 231. The intermediate worm-wheels and the intermediate gear-wheels with which they are fast may slide freely along their respective shafts, transverse sliding nevertheless maintaining meshing between the intermediate gear-wheels 215a, 215b and the output gear-wheel ring 217. This embodiment offers the same advantages as those previously described.

Finally, there are schematically represented in FIGS. 7 to 9 three other alternative embodiments of the transmission in accordance with the invention. In FIG. 7, it is seen that the shaft 301 rotates in two bearings 302a, 302b and carries, in the area not between these two bearings, two worms 303a, 303b with equal and opposite pitch. The transmission comprises two intermediate worm-wheels 314a, 314b fast with two intermediate gear-wheels 315a, 315b and two auxiliary worm-wheels 316a, 316b; the four worm-wheels 314a, 314b, 316a, 316b have pitch cylinders of the same diameter and helical teeth. The two intermediate gear-wheels 315a, 315b have the same diameter. The difference as compared with all the embodiments previously described is that the plane of the axes of the two worm-wheels which cooperate with the same worm is not perpendicular to the axis of the shaft 301 but slightly oblique. In this case, the reactions of the worm-wheels on the worms are not exactly symmetrical, but these reaction forces nevertheless remain moderate if the offset X which creates the oblique relationship remains low. It will be understood that, in order to conform to meshing constraints, X must be equal to or a multiple of the apparent pitch of the worm-wheels. For greater clarity, the output gear-wheel meshing with the intermediate gear-wheels 315a and 315b has not been shown.

In FIG. 8 there is represented an embodiment in which the diameters of the pitch cylinders of the auxiliary worm-wheels are different from the diameters of the pitch cylinders of the intermediate worm-wheels; nevertheless, the axes of the worm-wheels cooperating with the same worm are in a plane perpendicular to the axis of the double worm. This embodiment provides for selecting auxiliary worm-wheels which are smaller than the intermediate worm-wheels in order to reduce the overall dimensions of the transmission. Given that the components represented in FIG. 8 are similar to those represented in FIG. 7, the components of FIG. 8 have been designated by reference numerals increased by 100 relative to those of the corresponding components in FIG. 7.

The FIG. 9 variant corresponds to a combination of the FIG. 7 and 8 variants. Given that the components represented in FIG. 9 are analogous to those represented in FIG. 8, on the drawing the components of FIG. 9 are designated by reference numbers increased by 200 relative to those adopted for the corresponding components in FIG. 7. In this embodiment, the auxiliary worm-wheels 516a, 516b have a pitch diameter less than the pitch diameter of the intermediate worm-wheels 514a, 514b with which they mesh, and the planes of the axes of the worm-wheels 514a and 516a, on the one hand, and 514b and 516b, on the other hand, are slightly oblique relative to the axis of the shaft 501. This arrangement provides for reducing the overall dimensions of the transmission in the same way as the arrangement of FIG. 8, but also makes it possible to arrange for the plane tangential to the worm-wheels 514b and 516b situated at the end of the shaft 501 to be perpendicular to the axis of the shaft, which can be a favorable factor in reducing the overall dimensions of the transmission. It will be understood that in this embodiment, as in that of FIG. 7, the reaction forces on the bearings 502a, 502b are not totally eliminated.

It will be understood that the embodiments described hereinabove are in no way limiting and can provide a starting point for all desirable modifications without exceeding the scope of the invention; in particular, the two intermediate gear-wheels may mesh externally on a gear-wheel situated between them and centred on the line of the axes of the intermediate gear-wheels, this gear-wheel being fast with a gear-wheel which meshes with the output gear-wheel, the shaft of which constitutues the output shaft.

I claim:

1. Gear transmission with two kinematic channels comprising a driving shaft (1, 11, 211, 301, 401, 501) carrying two worms (3a, 3b; 13a, 13b; 213a, 213b; 303a, 303b; 403a, 403b; 503a, 503b) with threads inclined in opposite directions, each of the two kinematic channels comprising two helical teeth intermediate worm-wheels (4a, 4b; 6a, 6b; 14a, 14b; 16a, 16b; 214a, 214b; 216a, 216b; 314a, 314b; 316a, 316b; 414a, 414b; 416a, 416b; 514a, 514b; 516a, 516b) each meshing with a respective one of the two worms on opposite sides, two of these intermediate worm-wheels of the respective kinematic channels being fast with a respective straight toothed intermediate gear-wheel (5a, 5b; 15a, 15b; 115a, 115b; 215a, 215b; 315a, 315b; 415a, 415b; 515a, 515b) coaxial with it, these two intermediate gear-wheels meshing with a common gear-wheel (7, 17, 217) keyed to a driven shaft, characterized in that the auxiliary worm-wheels of a given kinematic channel (4a, 6b–14a, 16b–214a, 216b–314a, 316b–414a, 416b–514a, 516b and 4b, 6a–14b, 16a–214b, 216a–314b, 316a–414b, 416a–514b, 516a) mesh together and are carried by common displacement means enabling them to move parallel to their axes in operation, whereas the shaft (1, 11, 211, 301, 401, 501) carrying the two worms is mounted so as to be free to move in the longitudinal direction.

2. Transmission according to claim 1 characterized in that the pitches of the two worms are equal and opposite, the radii of the pitch cylinders of the two intermediate worm-wheels being equal to one another, as are those of the two intermediate gear-wheels.

3. Transmission according to either of claims 1 and 2, characterized in that the two intermediate worm-wheels are linked together by means (21, 22; 129, 130; 229, 230) able to move in translation parallel to the axes of the two intermediate worm-wheels.

4. Transmission according to claim 3 characterized in that the means linking the two intermediate worm-wheels is a plate (21, 22; 129) relative to which the two intermediate worm-wheels may freely turn.

5. Transmission according to claim 3 characterized in that the means linking the two intermediate worm-wheels is an idler roller (229) which cooperates with a corresponding rolling track (228a, 228b) formed on the respective intermediate gear-wheel (214a, 214b).

6. Transmission according to either of claim 3 characterized in that the means (21, 22) linking the two intermediate worm-wheels (14a, 14b) also link the two auxiliary worm-wheels (16a, 16b) which can rotate freely relative to said linking means.

7. Transmission according to any one of claim 1 characterized in that the gear-wheel (17) which meshes with the two intermediate gear-wheels (15a, 15b) has its pitch cylinder externally tangential to the pitch cylinders of the two intermediate gear-wheels.

8. Transmission according to any one of claim 1 characterized in that the gear-wheel (7, 217) which meshes with the two intermediate gear-wheels (5a, 5b; 215a, 215b) has its pitch cylinder internally tangential to the pitch cylinders of the two intermediate gear-wheels.

9. Transmission according to claim 2 characterized in that the radii of the pitch cylinders of the auxiliary worm-wheels (6a, 6b; 16a, 16b; 216a, 216b; 316a, 316b) are equal to the radii of the pitch cylinders of the intermediate worm-wheels (4a, 4b; 14a, 14b; 214a, 214b; 314a, 314b).

10. Transmission according to claim 2 characterized in that the radii of the pitch cylinders of the auxiliary worm-wheels (416a, 416b; 516a, 516b;) are different from the radii of the pitch cylinders of the intermediate worm-wheels (414a, 414b; 514a, 514b).

11. Transmission according to any one of claim 1 characterized in that the axes (24a, 24b) of the intermediate worm-wheel of one kinematic channel and the axis (26a, 26b) of the auxiliary worm-wheel of the other kinematic channel define a plane perpendicular to the axis of the shaft (11) carrying the two worms.

12. Transmission according to any one of claim 1 characterized in that the axis of the intermediate worm-wheel (314a, 314b; 514a, 514b) of one kinematic channel and the axis of the auxiliary worm-wheel (316a, 316b; 156a, 516b) of the other kinematic channel define a plane which is oblique relative to the axis of the shaft (301, 501) carrying the two worms.

* * * * *